United States Patent [19]

Oudet et al.

[11] Patent Number: 4,985,652

[45] Date of Patent: Jan. 15, 1991

[54] SINGLE-PHASED ANGULAR ELECTROMAGNETIC ACTUATOR

[75] Inventors: Claude Oudet, Besancon; Daniel Prudham, Thise, both of France

[73] Assignee: Moving Magnet Technologies S.A., Besancon, France

[21] Appl. No.: 460,548

[22] Filed: Jan. 3, 1990

[30] Foreign Application Priority Data

Nov. 6, 1989 [FR] France ................. 89 14507

[51] Int. Cl.⁵ ............ H02K 33/16; G11B 5/55; G11B 21/08
[52] U.S. Cl. .................. 310/15; 310/49 R; 360/106
[58] Field of Search ........... 360/105, 106; 310/15, 310/49 R

[56] References Cited

U.S. PATENT DOCUMENTS

| | | | |
|---|---|---|---|
| 4,476,404 | 10/1984 | Bygdnes | 360/105 |
| 4,544,972 | 10/1985 | Kogure et al. | 360/105 |
| 4,635,151 | 1/1987 | Hazebrouck | 360/105 |
| 4,716,483 | 12/1987 | Walsh | 360/106 |
| 4,879,617 | 11/1989 | Sampietro et al. | 360/106 |

FOREIGN PATENT DOCUMENTS

| | | | |
|---|---|---|---|
| 0217973 | 9/1986 | Japan | 360/105 |
| 0058678 | 3/1988 | Japan | 360/105 |
| 2170346 | 7/1986 | United Kingdom | 360/105 |

*Primary Examiner*—Steven L. Stephan
*Assistant Examiner*—Dennis R. Haszko

*Attorney, Agent, or Firm*—Oblon, Spivak, McClelland, Maier & Neustadt

[57] ABSTRACT

An angular single-phased electromagnetic actuator including a stator structure constituted of a first magnetic stator part and a second magnetic stator part connected exclusively by a non-magnetic spacer. A movable member including a thin magnetized portion is provided within an air gap between the stator parts. Stator parts are selected so as that:

$$S_{fer} \geq \frac{B_a}{B_{fer}} \times S_a,$$

where, $S_{fer}$ is the section of the stator part as measured in any radial plane included in the area scanned by the movable radial plane defined by the radius between the two adjacent poles of the magnetized portions, $S_a$ is the surface of one among the 2N pairs of poles as measured in the plane normal to the magnetization,

$B_{fer}$ is the induction within the stator, $B_a$ is the induction within the magnet, with $$B_a = B_r \times \frac{L}{E}$$

$B_r$ is the remanent induction of the magnet,
L is the magnet thickness, and
E is the distance between the stator poles, in the absence of the magnetized portion.

13 Claims, 7 Drawing Sheets

FIG_8

FIG_9

SINGLE-PHASED ANGULAR ELECTROMAGNETIC ACTUATOR

BACKGROUND OF THE INVENTION

1. Field of the Invention

This invention is related to a single-phased electromagnetic actuator including a stator structure having two stator parts provided on both sides of a thin magnetized portion of an angularly movable member.

2. Discussion of the Background

An electromagnetic actuator as above-noted is disclosed in the International Patent Application CH-8 700 063 filed June 1, 1987 on the priority of the Swiss Patent Application No. 22,886 filed June 2, 1986. In the electromagnetic actuator disclosed in this International Application, each of the stator parts is formed with a very high magnetic permeability material. At least one of these parts has $2N+1$ magnetic poles of which one half is energized by an electrical coil. The thin portion includes $2N$ pairs of magnetized poles which are transversally magnetized and alternate in the angular motion direction. The thin magnetized portion has through the whole working range a substantially linear demagnetization characteristic. Such electromagnetic actuators as above-noted allow the movable member to move within a limited distance with a substantially constant strength. Such apparatus, however, has a major drawback. In effect, the magnetic circuit closing must necessarily be done by means of magnetic seals provided either in the stator structure rear part, namely perpendicular to the displacement path of the movable member, or in some planes being parallel to the displacement path of the movable member. This results in a significant increase of the overall space required by the stator structure.

The overall space requirements for these actuators are increasingly critical, and a number of applications require an extreme miniaturization not compatible with the embodiments of the apparatus such as known in the prior art.

SUMMARY OF THE INVENTION

Accordingly, one object of this invention is to provide a novel solution to the overall space problem above described.

This and other objects are achieved according to the present invention by providing a new and improved electromagnetic actuator, contrary to that taught by the prior art, which includes two stator parts interconnected through one or more non-magnetic spacers defining an air gap in which is inserted the magnetized portion of the movable member. The magnetic circuit closing is made within the magnetic pole width of the stator parts. When the flux due to the magnet is much higher than the flux due to the ampere-turns, the iron section $S_{fer}$ of each of the stator parts is:

$$S_{fer} \geq \frac{B_a}{B_{fer}} \times S_a$$

where, $S_{fer}$ is the section of the stator part as measured in any radial plane included in the area scanned by the movable radial plane defined by the radius passing between two thin magnets and the movable member rotation axis junction, $S_a$ is the surface of one among the $2N$ pairs of poles as measured in the plane perpendicular to the magnetization, $B_{fer}$ is the induction within the stator, $B_a$ is the induction within the magnet, with $$B_a = B_r \times \frac{L}{E}$$

$B_r$ is the remanent induction of the magnet, $L$ is the magnet thickness, $E$ is the distance between the stator poles, in the absence of the magnetized portion.

The movable member clearance is limited so as to prohibit the magnetized portion displacement beyond the area in which the release force becomes decreasing.

Advantageously, at least one of the radial edges of the stator structure includes a bevel. Such bevel allows the release force which develops in the absence of any current to adjust. This provision allows the construction of an actuator of which the movable member remains at a limit stop in the absence of any current. This type of actuator is particularly adapted to construction of an arm actuator to support the read-write head of a hard disk. In such case, desirably the arm is to be locked in a position in which the head is not hanging over the tracks of the hard disk and to be kept at this position by a force sufficient to avoid damage during transportation, handling or merely on a disk rotation stop initiated to save battery power. The latter solution is the more and more often adopted for portable computers which typically include systems which stop the disk rotation when the disk storage has not been used for a predetermined period of time.

According to another embodiment, the movable member clearance is limited so as to prohibit the magnetized portion movement beyond the area in which the force is constant for a constant current. In that case, the force is constant for a constant current or the whole of the movable member displacement area.

Advantageously, the pairs of magnetized poles are supported by a non-magnetic armature. In effect, in order to miniaturize the angular actuator, the magnetized portions are made thinner and thinner. Due to their nature, the high performance magnetic materials are substantially brittle. The insertion in the recess of angular sector form of a non-magnetic armature ensures a good rigidity also when the movable member is subject to significant accelerations.

Similarly, it is advantageous to carry out an encapsulation of the thin magnetized portion with two layers of ductile materials.

In effect, considering the miniaturization requirements, angular electromagnetic actuators must be produced in a clean room, and it is mandatory to avoid any contamination from dust or magnet chips. However, the brittleness of thin magnets which are employed leads unavoidably, on handling and assembly of such magnetic actuator components, to drops or impacts. The encapsulation between two layers of ductile materials allows eliminating the thin magnet chips to escape and contaminate the clean room.

According to a first embodiment, the magnetized portion is encapsulated between two sheets of thin thermo-plastic materials. As a non-exclusive example, polyimide sheets of 50 $\mu$m thickness or less can be used.

According to another embodiment, the thin magnetized portion is coated on both sides with a hardenable resin layer. As an example, a layer of epoxy resin can be used.

According to a preferred embodiment, the thin magnetized portion is encapsulated between two sheets of magnetic soft materials. By way of example, a sheet of 50/50 iron-nickel material or an alloy even richer in nickel such as "MUMETAL", a registered trademark associated with an alloy of almost stainless steel manufactured by Creusot-Loire. This material is very ductile. Furthermore, this ensures flux uniformity which minimizes the effect of small variations within the material constituting the thin magnetized portion. In addition, the thickness of such protective layer simply as itself increases the thin magnetized portion thickness, and accordingly does not reduce the gap between the two stator parts and the movable member magnetized portion.

According to a preferred embodiment, the non-magnetic space is formed of a semi-annular part including a central recess in angular sector form substantially corresponding to the movable member clearance, such spacer including a positioning groove for at least one electrical coil. Such spacer can advantageously be formed with molded plastic, which facilitates the final mounting of the electromagnetic actuator in so far as the electrical coil can be mounted on a particular production line on the molded part. The mounting of the angular actuator is then limited to the superposition of two stator parts and the spacer, and to the insertion of the movable member. In this way, a thin magnet is provided by insert molding around the magnetic portion a part which becomes the armature. In particular, the plastic material is actually molded onto the magnetic part in this embodiment, and the molded plastic material becomes the armature.

Advantageously, the spacer includes 2N ribs for the separation of the magnetic poles of the stator part. This embodiment allows one of the stator parts to be constructed through a simple insertion of very high magnetic permeability parts in the corresponding recesses.

According to an advantageous embodiment, the movable member is constructed by a thin magnet having a plastic material molded thereon to form the armature.

Such armature is provided advantageously with a semi-cylindrical shoulder intended for the connection with the pivoted support. This embodiment allows the construction of movable members to be a little brittle, with a reduced manufacture cost.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
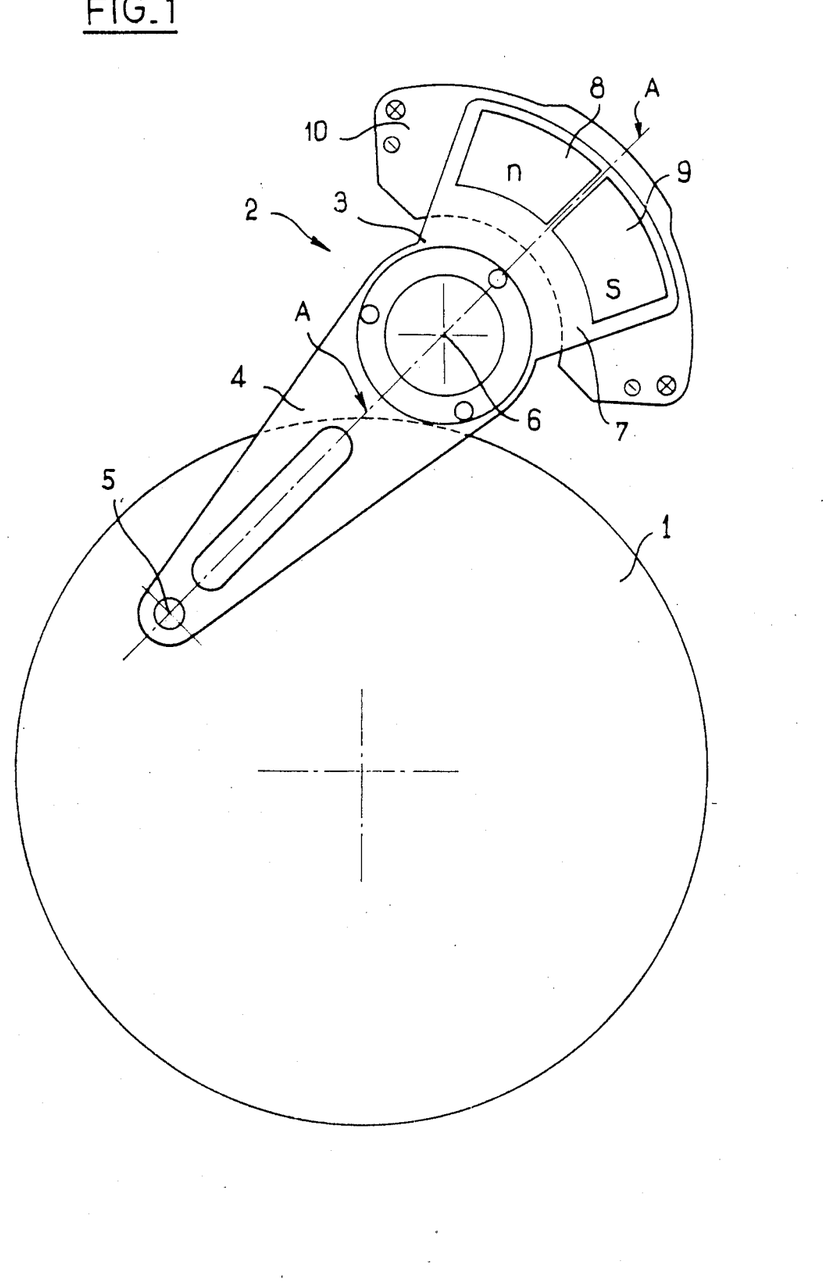
FIG. 1 is a front view of a read-write device of a hard disk.

Referring now to the drawings, wherein like reference numerals designate identical or corresponding parts throughout the several views, and more particularly to FIG. 1 thereof, FIG. 1 shows, schematically, a hard disk drive comprising a hard disk (1) and an angular actuator (2). The actuator (2) includes a movable member (3) provided with an arm (4) bearing the read-write head (5). The movable member (3) is mounted on an axial pivot (6). It includes on the side axially facing the read-write head (5), an armature (7) supporting two pairs of magnetic poles or magnets (8, 9). The electromagnetic actuator (2) further includes a stator structure (10).

Figure 2:
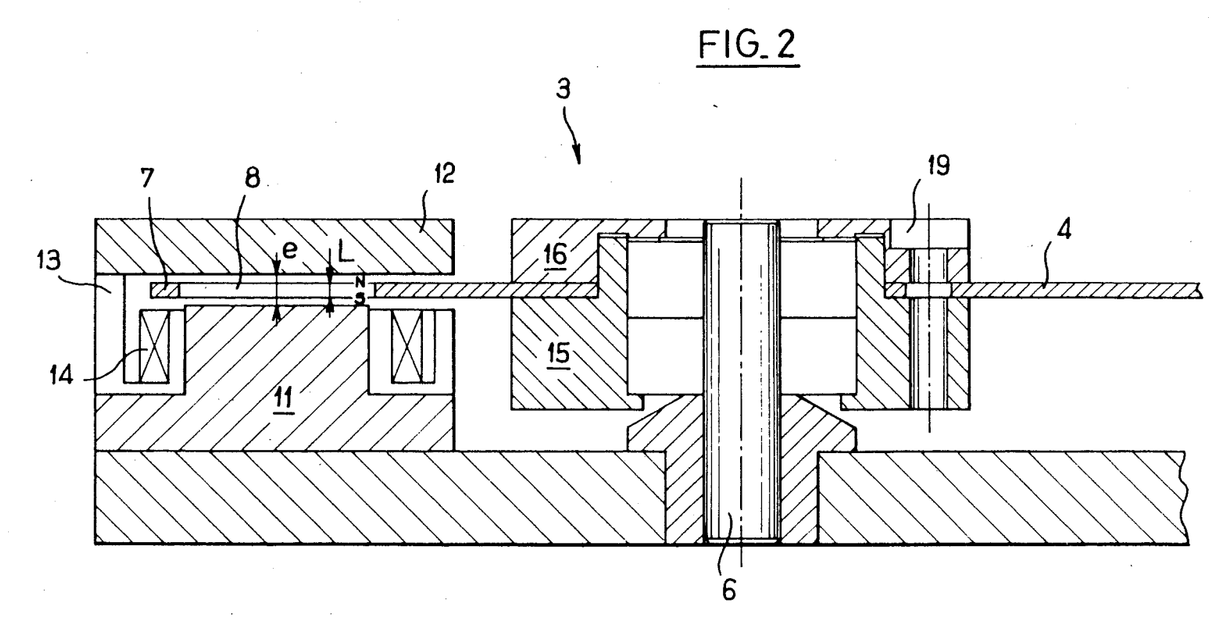
FIG. 2 shows a view of the angular actuator of the present invention in axial cross-section.

FIG. 2 is a sectional view taken along drawing plane A—A of the angular actuator. The angular actuator includes a first stator part (11), a second stator part (12), a spacer (13) and the movable member (3) formed by the armature (7) and the thin magnetized portion of the magnet (8). The thin magnetized portion is to be transversally mounted, i.e. in the thin part thickness direction The north pole of one among the magnetized portions will hence be directed upwards, i.e. towards the second stator part (12) for the first pair of poles (8), and in the opposite direction for the second pair of poles (9). A coil (14) is supported by the spacer made of molded plastic material. Therefore, such spacer (13) ensures both the positioning of the electrical coil (14) and the insulation thereof with respect to the stator circuit.

Both stator parts (11, 12) are constructed of a very high magnetic permeability material. The thickness of each of stator parts (11, 12) is selected so that the section thereof in the plane shown in FIG. 2 complies with the formula $$S_{fer} \geq \frac{B_a}{B_{fer}} \times S_a$$

where, $S_{fer}$ is the section of the stator part as measured in any radial plan included in the area scanned by the radial movable plan defined by the radius between two thin magnets and the movable member rotation axis junction, $S_a$ is the surface of one among the 2N pairs of poles as measured in the plan normal to the magnetization, $B_{fer}$ is the induction within the stator, $B_a$ is the induction within the magnet, with $$B_a = B_r \times \frac{L}{E}, \text{ and}$$

L is the thickness of the magnetized portion (8), and
$B_r$ is the remanent induction of the magnetized portion (8), and
E is the air gap dimension.
The ratio $$\frac{L}{E}$$

is less than one, and preferably is between 0.5 and 0.7. For actuators intended for magnetic memories with hard disks, L is generally between 0.6 and 1 mm.

Such formula should apply, particularly, to the central area scanned by the movable radial plane as defined by the rotation axis (6) on one hand, and, on the other hand, by the radius passing between two thin magnets (8, 9). This circular area corresponds substantially to a central pole (23) shown in FIG. 4. To the ends of the stator parts, the radial section can, eventually, be less than the section $S_{fer}$ so as to reduce the required space and/or the actuator weight.

The armature attachment onto the pivot is made by known means. By way of example, as shown in FIG. 2, the armature is stretched between two flanges (15, 16) also ensuring the integrality with the arm (4). The assembly formed by the flanges (15, 16) and the arm (4) rotates about the fixed axis (6) through two bearings.

Figures 3, 4:
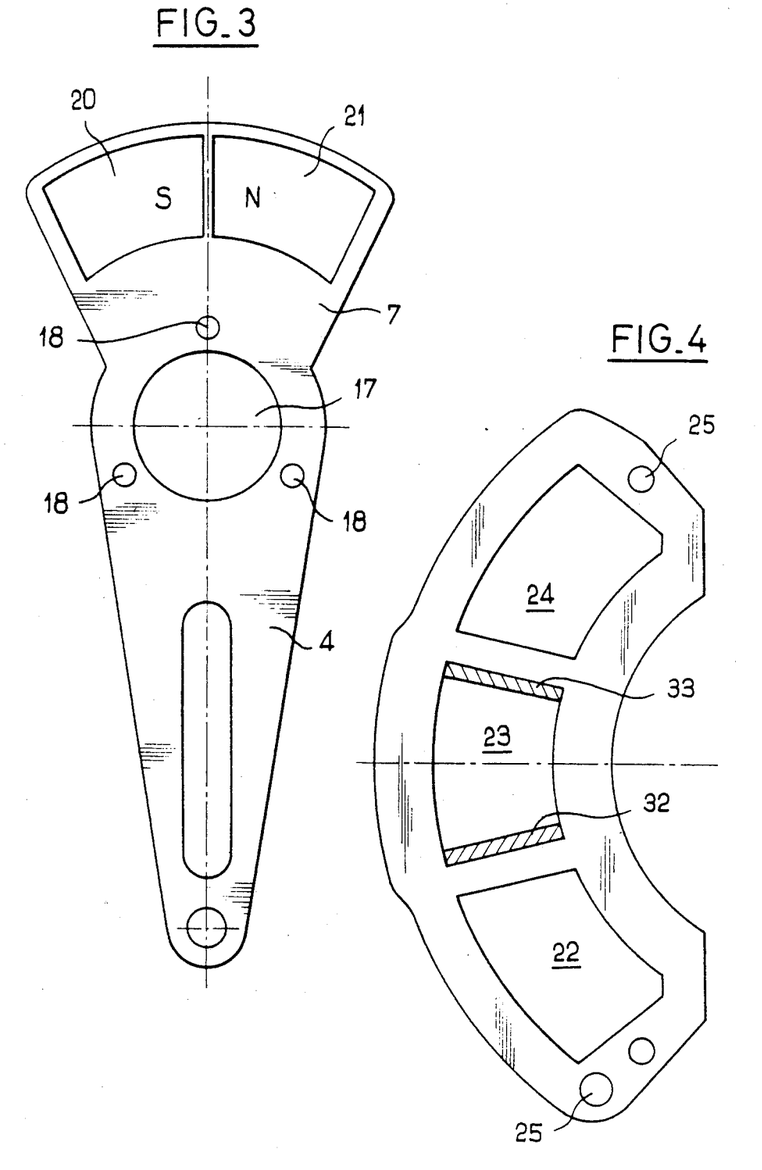
FIG. 3 is a front view of the movable member.
FIG. 4 is a front view of the lower stator.

FIG. 3 shows a front view of the movable member (3). The movable member (3) is made of stainless steel and includes the armature (7) extending with the arm (4). The central part encloses a recess (17) in which can be inserted the flange (15). Three holes (18) provide a passage way for the clamping bolts (19).

The armature (7) has two recesses (20, 21) in angular sector form. Both thin magnets (8, 9) are inserted in these recesses. Preferably, such recesses are symmetrical with respect to the longitudinal axis (22). Thus, it is possible to construct only one thin magnet type. The insertion within either of the recesses (20, 21) ensures automatically the correct orientation of the north and south poles. To that end, the recesses should of course not be in symmetric arrangement to a medium radial line. Next to the insertion of the thin magnets (8, 9) in the recesses (20, 21) of the movable member, a thin sheet approximately 50 μm in thickness made on 50/50 iron-nickel is adhered on each side.

FIG. 4 shows a front view of the lower stator part (11). This part is made of ARMCO iron and has an angular sector form. It includes three poles (22, 23, 24), the central pole (23) of which has an angular width equal to that of each of the poles of both thin magnet (8, 9) decreased by the angular width of the slot which separates respectively the poles (22, 23) and (23, 24) and the side poles (22, 24) having an angular width at least equal to that of the pole (22).

Ideally, the inner and outer radii defining the polar magnet pairs (8, 9) of the rotor, and the inner and outer radii defining the stator poles (22, 23, 24) are respectively equal and centered on the rotation axis. However, in order to reduce the manufacturing cost of the actuator, the stator poles (22, 23, 24) can be allowed to be radially larger than the magnets (8, 9) and as molded. Providing that the circular edges of the magnets (8, 9) be properly machined and properly centered onto the rotation axis, the magnet volume used in this embodiment is then at a minimum, and the face of the stator which is higher with respect to the magnets, can be flat.

Further, a satisfactory result can be obtained by magnetizing only one part of the magnet larger than required corresponding to poles intended to be created. These two magnetized portions correspond both in shape and dimension to the shape and dimensions of the thin magnets (8, 9) previously described. The drawback of such embodiment is that it requires a wider magnet volume, and hence leads to a slightly higher manufacturing cost.

Additionally, the construction of magnets wider than the stator poles and magnetized uniformly on all surfaces thereof can be considered. This embodiment is advised if the stator parts are considered as easier to obtain with edges quite concentrical to the axis. In such case, the stator poles shall be constructed at least to a height of approximately 1 mm on the upper stator in order that no attraction towards the stator appears when the magnet is centered within the air gap. The increasing in width of stator poles with regard to width of the magnet, or conversely, must be at least equal to E so that the wide pole defect has no effect on the actuator operation.

The stator part includes at the ends thereof holes (25) to provide a passageway for the mounting screws. The central pole (23) includes along the side edge (32) a bevel to allow the release force to be adjusted in the absence of a current inside the electrical coil. In the most cases, particularly when the $$\frac{L}{E}$$

ratio is large and near to 1, the absence of bevel can result in, when the read-write head is out of position, a release torque so large that it is difficult or even impossible for the movable member to move out subsequently from the end position thereof. Both the angle and extent of such bevel shall be determined by successive experimentation.

For a number of applications requiring two extreme positions, steady in the absence of current, it shall be expected that the central pole (23) includes a bevel along the first side edge (32) arranged at the pole side and a second bevel along the opposite radial edge.

Figure 5:
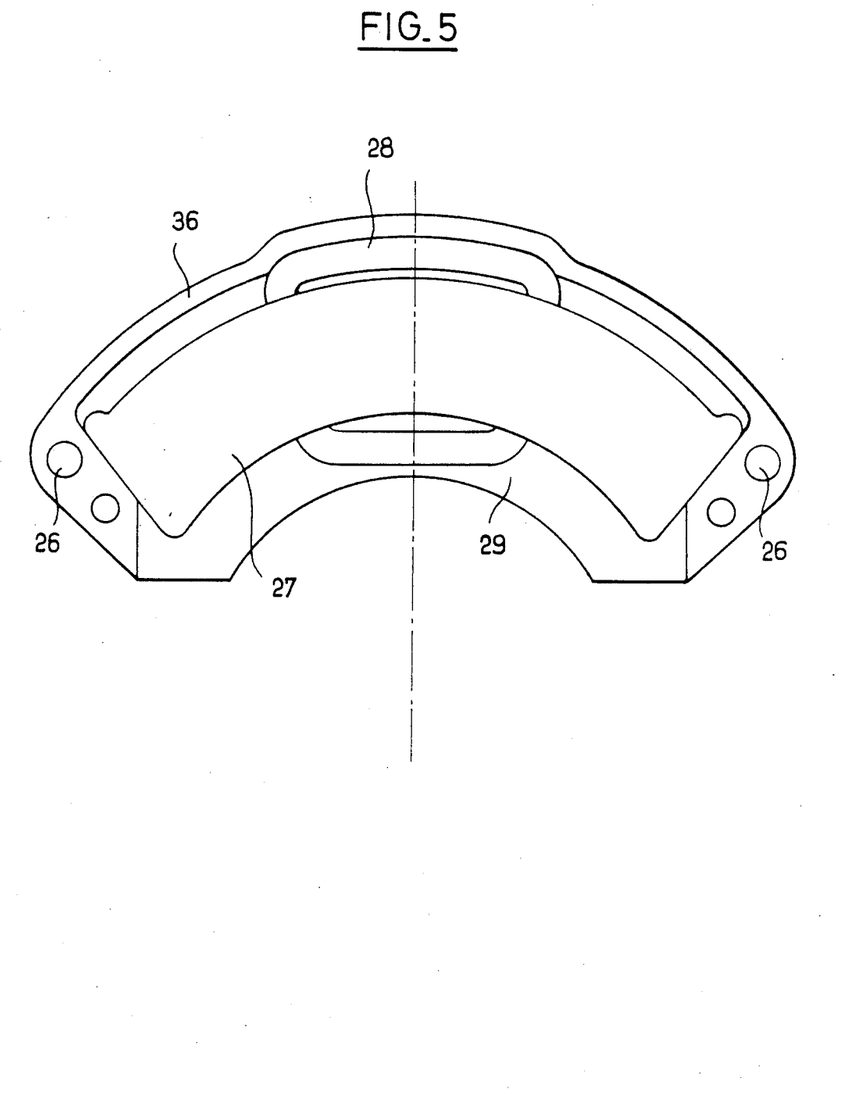
FIG. 5 is a front view of the spacer.

FIG. 5 shows a front view of the spacer (13). This spacer (13) is made of molded plastic material. The dimensions thereof correspond substantially to the stator part dimensions. Additionally, it includes at its ends a number of holes (26) for the passage of mounting screws. It includes a central recess (27) providing a passage for the poles (22-24) of the first stator part (11). Additionally, it includes a groove (28) ensuring the electrical coil (14) positioning. The spacer width at places not scanned by the movable member determines the height of the stator circuit air gap. In the example shown, this thickness is determined particularly by the spacer thickness at the holes (26) for the clamping bolt passage, and along the rear edge (36).

On the other hand, the thickness of the front edge (29) is less so as to provide for insertion of the movable member armature (7).

Figure 6:
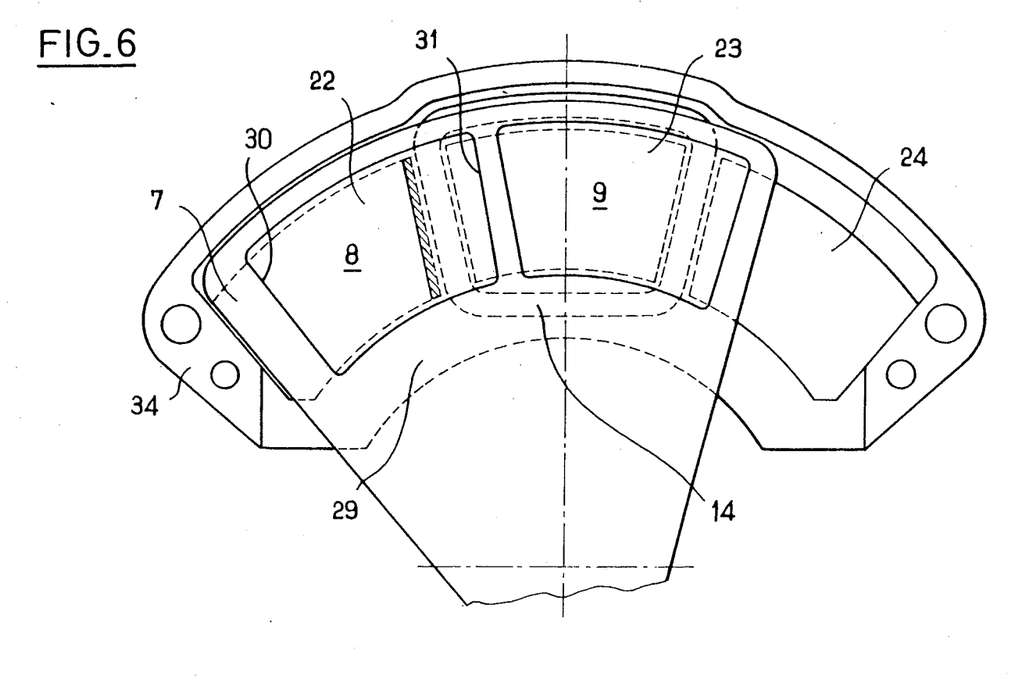
FIG. 6 is a partial front view of the first stator part of the movable member spacer.

FIG. 6 shows a front view of the actuator wherein the second stator part (12) is removed. The movable member (7) is shown in abutment at the left. The outer edge (30) of the magnetized portion (8) as well as the intermediate edge (31) remain within the stator circuit. The side edge (34) of the spacer forms a stop limiting the movable member displacement.

Figure 7:
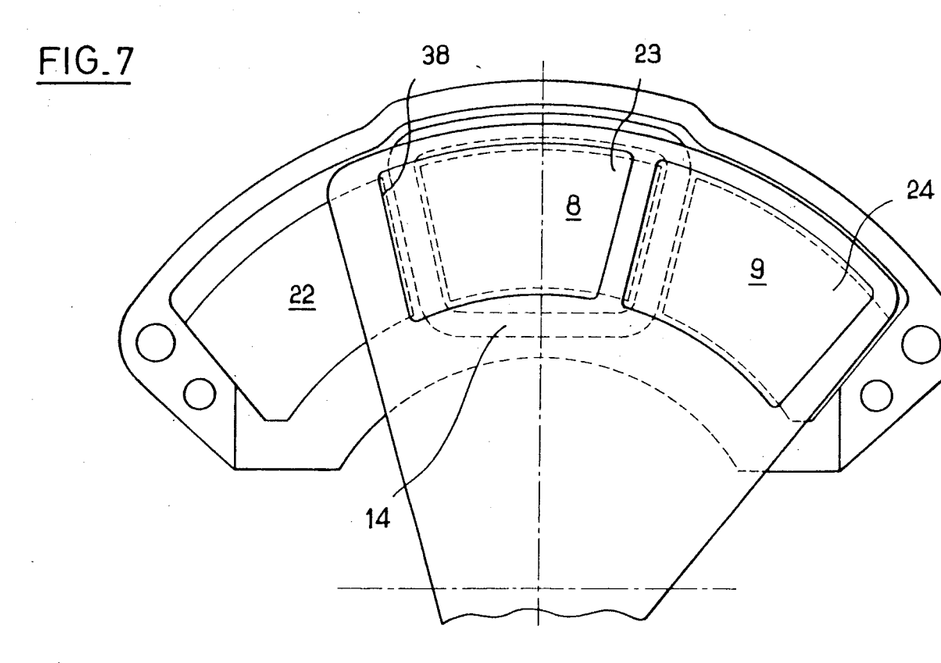
FIG. 7 is a partial front view of the first stator part, the movable member being in a right end position.

FIG. 7 shows a front view of the actuator stopped on the right. The side edge (38) of the pole (22), at the side of a central pole (23), includes a bevel. This bevel adjusts the release torque existing when the coil (14) is not electrically energized. Owing to this, the movable member remains at stop on the right even if the apparatus is subjected to light shocks.

Figure 8:
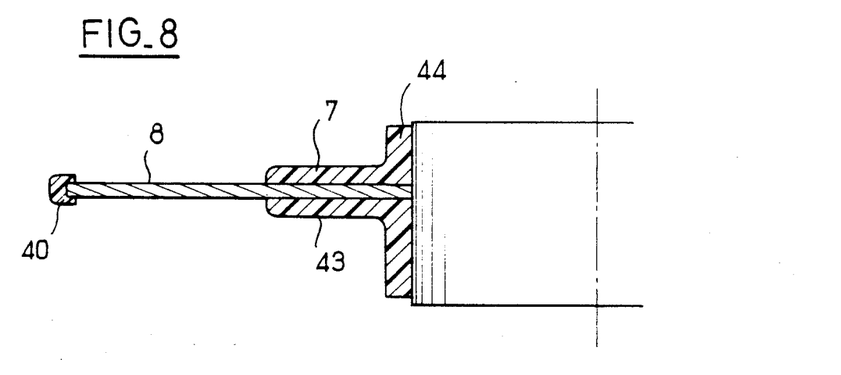
FIG. 8 is an axial cross-section view of another embodiment of the movable member.
Figure 9:
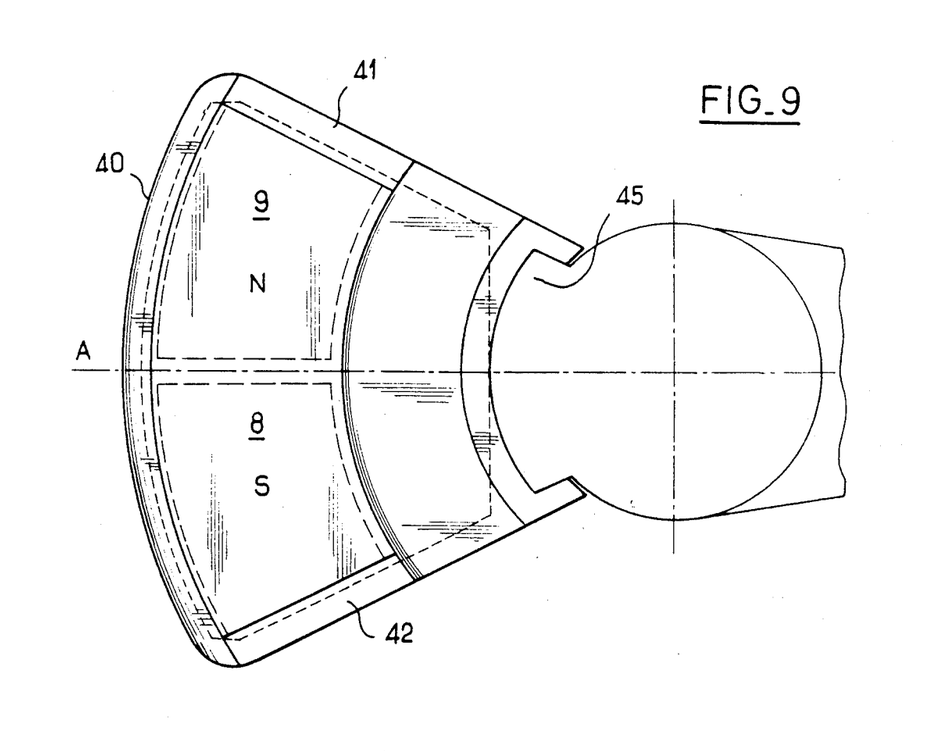
FIG. 9 is a front view of a such movable member.

FIG. 8 shows an axial sectional view and FIG. 9 a front view of the movable member of an actuator constructed according to particular form. The armature (7)

is formed according to this embodiment by molding a plastic material onto the periphery of a thin magnet, the molded plastic then becoming the armature. Thin magnets made of neodyme-iron-boron are used and have a low coefficient of expansion in the direction normal to the magnetization. The armature is molded onto the periphery of the thin magnet and is formed with an anisotropic plastic material, for instance, Rynite marketed by Du Pont de Nemours Corporation. The Rynite grade 555 has a module in flexure particularly high and a very low coefficient of expansion, less than that of steel in the direction of the material flowing in the mold. Another preferred plastic material for this application is sold by Celanese GmbH, a German Company, under the tradename "VECTRA A230 or 230".

Preferably, the thickness of the compound-filling of the outer circular portion (40) is slightly smaller than the air gap dimension E in order to provide an easy mounting of the rotor in the assembled stator. Within both radial areas (41, 42), the compound-filling thickness is approximately equal to the thickness of the thin magnet (8, 9) increased by 0.2 mm. Therefore, the magnet is only coated, on each side, with a border having a thickness on the order of 0.1 mm. This border (41, 42) width is about 0.4 mm and corresponds to the width on which the plastic material accepts to flow. These small dimensions are sufficient in order to protect the magnet angles, since the magnets are always brittle. The shear strength of the border is sufficient in order to resist the attraction stresses following the possible axial decentering of the magnets within the air gap due to manufacturing tolerances. On the part corresponding to outer radius to the inner radius of the stator poles, the molded plastic can be wider to increase the rigidity. In this case, a sufficient backlash between the coil and the upper stator should be provided. Eventually, the molded plastic can broaden along an upright cylindrical wall portion (44) used for centering the rotor and its attachment, through adhesive bonding for example, onto the headholder arm. The adjustment of this semi-cylindric portion on the arm can be operated by the cooperation of two complementary profiles forming a dovetail (45). Following the adjustment of the height, final setting is made by adhesive bonding or by any other known means. This embodiment provides for the adjustment of the height of the rotor in order to bring it accurately in the middle of the stator air gap, the backlash being extremely reduced according to the other degrees freedom.

The magnet can be made of only one material of large dimension extending up to the semi-cylindrical portion (44). The magnetization in both opposite directions is only carried out after compound-filling in the plastic material. This magnetization is made by applying directly the induction poles on the magnet or on the iron-nickel layers. Such structure provides for the magnet having a sintered outer profile. The manufacturing process of such movable member can also use two complementary half-shells, stretching the thin magnet after connection.

Of course, the invention applies to numerous alternatives, and is not limited to the example described for purpose of illustration in the foregoing description. In particular, the number of poles, or the selection of materials, or the shape of the various components of the angular actuator can be changed within this scope of this invention.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An angular single-phased electromagnetic actuator comprising:
    a stator structure having two stator parts provided opposite each side of a thin magnetized portion of an angularly movable member, each of said stator parts made of a material having a very high magnetic permeability, at least one of the stator parts having 2N+1 magnetic poles where N is an integer, at least one of said magnetic, poles being energized by an electrical coil, a finite portion, being formed with 2N pairs of alternate poles, transversely magnetized, the thin magnetized portion having over its working range a substantially linear demagnetization characteristic;
    wherein the two stator parts are connected exclusively by one or more non-magnetic spacers defining an air gap in which is fitted the thin magnetized portion of the movable member; and
    wherein the following relationship holds, $$S_{fer} \geq \frac{B_a}{B_{fer}} \times S_a,$$

where,
    $S_{fer}$ is the section of one of the stator parts as measured in any radial plane defined by the radius passing between the two thin magnetized portions and a rotation axis of the movable member,
    $S_a$ is the surface area of one of the 2N pairs of the poles as measured in the plane normal to the magnetization,
    $B_{fer}$ is the induction in the stator,
    $B_a$ is the induction in the magnet, and
    the movable member clearance is limited so as to prohibit the displacement of the magnetized portion beyond an area wherein a release force becomes decreasing.

2. An angular single-phased electromagnetic actuator according to claim 1, wherein the movable member clearance is limited so as to prohibit the displacement of the magnetized portion beyond an area in which the force is constant for a constant current.

3. An angular single-phased electromagnetic actuator according to claim 1, wherein at least one of radial edges of the stator structure includes a bevel.

4. An angular single-phased electromagnetic actuator according to claim 1, wherein the pairs of magnetized poles are supported by a non-magnetic armature including recesses.

5. An angular single-phased electromagnetic actuator according to claim 4, wherein the recesses of the armature are dissymmetrical with regard to a medium radial axis.

6. An angular single-phased electromagnetic actuator according to claim 5, comprising:
    two layers of ductile material encapsulating the thin magnetized portion therebetween.

7. An angular single-phased electromagnetic actuator according to claim 6, comprising:

a thin thermo-plastic sheet adhered to each side of the magnetized portion.

8. An angular single-phased electromagnetic actuator according to claim 6, comprising:
a layer of hardenable resin coating each side of the thin magnetized portion.

9. An angular single-phased electromagnetic actuator according to claim 6, comprising:
two layers of magnetic soft material encapsulating the thin magnetized portion therebetween.

10. An angular single-phased electromagnetic actuator according to claim 1, wherein the spacer comprises:
a semi-annular part including a central recess corresponding to the movable member clearance as well as a positioning of at least one electrical coil.

11. An angular single-phased electromagnetic actuator according to claim 10, wherein the spacer comprises:
2N separation ribs provided for separation of the magnetic poles of the stator part.

12. An angular single-phased electromagnetic actuator according to claim 1, wherein the movable member is formed by a plastic material molded onto the periphery of the magnet and forming an armature.

13. An angular single-phased electromagnetic actuator according to claim 12, wherein the armature includes a semi-cylindrical shoulder intended for a connection with a pivoted support.

* * * * *